United States Patent [19]

Sugiura et al.

[11] 3,935,180

[45] Jan. 27, 1976

[54] POLYBUTADIENE AND PROCESS FOR PRODUCING SAME

[75] Inventors: Shotaro Sugiura; Tetsuro Matsuura; Haruo Ueno; Minoru Kono; Hideo Ishikawa; Thunehiko Tokutomi, all of Ichihara, Japan

[73] Assignee: UBE Industries, Ltd., Japan

[22] Filed: Aug. 31, 1973

[21] Appl. No.: 393,290

Related U.S. Application Data

[63] Continuation-in-part of Ser. No. 210,597, Dec. 21, 1971, abandoned.

[52] U.S. Cl............ 260/94.2 R; 260/94.3; 260/879
[51] Int. Cl........................... C08d 3/08; C08d 1/14
[58] Field of Search............ 260/94.3, 94.4, 94.2 R, 260/94.7 R, 879

[56] References Cited
UNITED STATES PATENTS

| | | | |
|---|---|---|---|
| 3,300,466 | 1/1967 | Marullo et al. | 260/94.3 |
| 3,301,840 | 1/1967 | Zelinski | 260/94.2 |
| 3,595,850 | 7/1971 | Takayanagi et al. | 260/94.3 |
| 3,778,424 | 12/1973 | Sugiura et al. | 260/94.3 |

*Primary Examiner*—William F. Hamrock
*Attorney, Agent, or Firm*—Burgess, Ryan & Wayne

[57] ABSTRACT

A process for producing a polybutadiene is provided wherein, first, 1,3-butadiene is polymerized in the presence of a particular cis-1,4-polymerization catalyst and subsequently, the polymerization is continued in the presence of a particular 1,2-polymerization catalyst. The resulting polybutadiene is characterized as containing 2 to 40% of the 1,2-structure, the melting point of the 1,2-structure portion being 110° to 215°C, and containing 60 to 98% of the cis-1,4-structure and having an intrinsic viscosity [$\eta$] of 0.9 to 8 in tetraline at 135°C. A vulcanized product of the polybutadiene is characterized as possessing improved tear strength, flex-crack resistance and tensile strength.

16 Claims, No Drawings

POLYBUTADIENE AND PROCESS FOR PRODUCING SAME

This is a continuation-in-part application of Ser. No. 210,597 filed on Dec. 21, 1971 now abandoned.

This invention relates to the production of a polybutadiene and more particularly, to a process for the production of a novel polybutadiene having a 1,2-structure content of 2 to 40% and a cis-1,4-structure content of 60 to 98%, which results in a vulcanized rubber product exhibiting greatly improved tear strength, flex-crack resistance and tensile strength.

Polybutadiene having a high cis-1,4-structure content has been produced on a large scale as a substitute for natural rubber for the production of tires and other rubber products, and many research reports have been published regarding the procedures for increasing the cis-1,4-structure content in polybutadiene. Rubber products obtained from high cis-1,4-polybutadiene, so called, are superior in some physical properties, particularly impact resistance, heat generation and abrasion resistance to products obtained from natural rubber. However, high cis-1,4-polybutadiene has some serious shortcomings in that it exhibits a high cold flow and rubber products obtained therefrom are considerably inferior in tear strength and flex-crack resistance. Many proposals have been made to reduce the cold flow but no practical proposal has yet been made to increase the tear strength and the flex-crack resistance of rubber products obtained from cis-1,4-polybutadiene.

However, a low tear strength and flex-crack resistance causes serious problems such as, for example, chipping of tires and other similar rubber products. Therefore, it is very desirable in the rubber and related industries to increase both the tear strength and the flex-crack resistance of rubber products obtained from polybutadiene.

An object of the present invention is to provide a polybutadiene capable of being made into a rubber product exhibiting improved tear strength and flex-crack resistance as well as the desirable properties associated with a conventional high cis-1,4-polybutadiene.

Another object is to provide a process for producing polybutadiene which is particularly useful for the manufacture of a rubber product having the advantageous properties mentioned above.

Other objects and advantages of the present invention will be apparent from the following description.

In accordance with the present invention, there is provided a process for the production of a polybutadiene which comprises the two successive steps of: first, polymerizing 1,3-butadiene in an inert organic solvent in the presence of a cis-1,4-polymerization catalyst consisting essentially of a. a cobalt component selected from the group consisting of ($a_1$) a cobalt compound and ($a_2$) a material formed by electrochemically depositing metallic cobalt on metallic zinc, and b. a halogen-containing organoaluminum compound represented by the formula $$AlR_nX_{3-n} \qquad (1)$$

wherein R is an alkyl or cycloalkyl group having 1 to 6 carbon atoms such as a methyl, ethyl, propyl, butyl, amyl, hexyl, cyclopropyl, or cyclohexyl group, or a phenyl group, X is a halogen atom and illustratively, chlorine, bromine and the like, and n is a positive number in the range of 1.5 to 2.0, thereby forming a cis-1,4-polybutadiene, and; secondly, without deactivating the remaining cis-1,4-polymerization catalyst and with addition or no addition of 1,3-butadiene and/or an inert organic solvent to the polymerization system, effecting the 1,2-polymerization of 1,3-butadiene by adding thereto a 1,2-polymerization catalyst comprising a'. a cobalt component selected from the group consisting of ($a'_1$) a cobalt compound and ($a'_2$) a material formed by electrochemically depositing metallic cobalt on metallic zinc, b'. an organoaluminum compound represented by the formula $$AlR_3 \qquad (2)$$

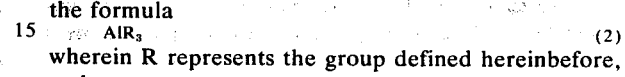

wherein R represents the group defined hereinbefore, and c'. carbon disulfide when the component ($a'$) is not the same as the component ($a$) of the cis-1,4-polymerization catalyst employed, or by adding to the polymerization system either all the components of said 1,2-polymerization catalyst or the components of said 1,2-polymerization catalyst except component ($a'$) when the component ($a'$) is the same as the component ($a$) of said cis-1,4-polymerization catalyst employed, thereby forming a polybutadiene containing 2 to 40% of the 1,2-structure and 60 to 98% of the cis-1,4-structure.

The 1,2-polymerization catalyst may contain, in addition to the cobalt component ($a'$), the organoaluminum compound ($b'$) and carbon disulfide ($c'$), a nitrile compound ($d'$) represented by the formula $$R'(CN)_m \qquad (5)$$

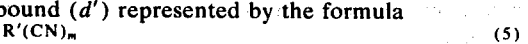

wherein $R'$ is an alkyl group having 1 to 10 carbon atoms, an aralkyl group having 7 to 10 carbon atoms or an aryl group having 6 to 12 carbon atoms and m is 1 or 2, in an amount such that the molar ratio [$R'(CN)_m/AlR_3$] of the nitrile compound ($d'$) to the organoaluminum compound ($b'$) is 0.1 to 30.

Cobalt compounds ($a_1$) to be used as component ($a$) of the cis-1,4-polymerization catalyst are those which are soluble in an inert organic solvent or liquid butadiene. Such soluble cobalt compounds preferably include, for example, cobalt complexes of β-diketones such as those represented by the formula

$$R_1-\underset{\underset{O}{\|}}{C}-\underset{\underset{R_3}{|}}{\overset{R_2}{C}}-\underset{\underset{O}{\|}}{C}-R_4 \qquad (3)$$

wherein each of $R_1$ and $R_4$ is an alkyl group having 1 to 3 carbon atoms and each of $R_2$ and $R_3$ is a hydrogen atom or an alkyl group having 1 to 3 carbon atoms, and β-keto acid esters such as those represented by the formula

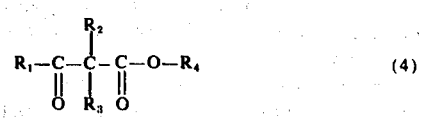

$$R_1-\underset{\underset{O}{\|}}{C}-\underset{\underset{R_3}{|}}{\overset{R_2}{C}}-C-O-R_4 \qquad (4)$$

wherein $R_1$, $R_2$, $R_3$ and $R_4$ are the same as defined with regard to the preceding formula (3). The most suitable cobalt complexes are cobalt (II) acetylacetonate, cobalt (III) acetylacetonate and the cobalt complex of acetoacetic acid ethyl ester.

The soluble cobalt compounds further include cobalt halide complexes such as those obtained from (A) a cobalt halide represented by the formula CoXn wherein X is a halogen atom, particularly chlorine, and n is 2 or 3, and (B) a ligand which is capable of forming a complex in coordination with the cobalt halide. The ligand includes, for example, tertiary amines such as pyridine, triethylamine, tributylamine and dimethylaniline; alcohols such as methyl alcohol and ethyl alcohol; tertiary phosphines such as triphenylphosphine and tributyl phosphine; ketones such as acetone; and N,N-dialkylamides such as N,N-dimethylformamide, N,N-dimethylacetamide and N,N-diethylacetamide. The most suitable cobalt halide complexes are a cobalt chloride-pyridine complex and a cobalt chloride-ethyl alcohol complex.

The soluble cobalt compounds further include, for example, cobalt salts of carboxylic acids having 6 to 10 carbon atoms such as cobalt octoate, cobalt naphthenate, cobalt benzoate, and the like.

Another cobalt component suitably used as component ($a$) of the cis-1,4-polymerization catalyst is a material ($a_2$) formed by electrochemically depositing metallic cobalt on metallic zinc; the characteristic of such materials and a process for the preparation thereof are described in detail in U.S. Pat. No. 3,423,387.

A halogen-containing organoaluminum compound represented by the formula $AlR_nX_{3-n}$ used as component ($b$) of the cis-1,4-polymerization catalyst preferably includes, for example, diethylaluminum monochloride, diethylaluminum monobromide, diisobutylaluminum monochloride, ethylaluminum sesquichloride and the like.

The amount of the components of the cis-1,4-polymerization catalyst used varies depending upon the particular catalyst component and the combination of same and the polymerization conditions. When the cobalt compound ($a_1$) is used as component ($a$), it is preferable to employ 0.002 to 50 millimoles, more preferably 0.01 to 5 millimoles, of the cobalt compound ($a_1$) together with 0.2 to 200 millimoles, preferably 0.5 to 20 millimoles, of a halogen-containing organoaluminum compound ($b$), both per mole of 1,3-butadiene. The molar ratio (Al/Co) of the halogen-containing organoaluminum compound ($b$) to the cobalt compound ($a_1$) is 5 to 500, and more suitably 15 to 100.

When the material ($a_2$) formed by electrochemically depositing metallic cobalt on metallic zinc is used as component ($a$) of the cis-1,4-polymerization catalyst, it is preferred to employ 0.025 to 5 g of the material ($a_2$) per 100 g of 1,3-butadiene together with the halogen-containing organoaluminum compound ($b$) in the amount of 0.1 to 5 times the weight of the aforesaid material.

The cis-1,4-polymerization catalyst obtained by mixing both the cobalt component ($a$) and the halogen-containing organoaluminum compound ($b$) may be preferably used after being aged to enhance the catalyst activity.

An inert organic solvent used in the process of the present invention is not particularly critical but should be capable of dissolving cis-1,4-polybutadiene produced in the first polymerization stage of the present invention. Suitable inert organic solvents include, for example, aromatic hydrocarbons such as benzene, toluene and xylene; aliphatic hydrocarbons such as n-heptane and n-hexane; alicyclic hydrocarbons such as cyclohexane; and a halogenated compound of hydrocarbons such as chlorobenzene.

The cis-1,4-polymerization may be suitably carried out at a temperature of −20° to 80°C, particularly 5° to 50°C under atmospheric pressure or a high pressure over a period of 10 minutes to 10 hours. The concentration of 1,3-butadiene to be polymerized is suitably 3 to 40% by weight based on the weight of the polymerization mixture at the beginning of the cis-1,4-polymerization.

The cis-1,4-polymerization should preferably be such as to give a cis-1,4-polybutadiene having 90% to 100%, more preferably 95% to 100% of the cis-1,4-structure and an intrinsic viscosity [$\eta$] (in toluene at a temperature of 30°C) of 1.5 to 8, more preferably 1.8 to 5.0. The desired intrinsic viscosity may easily be obtained by using a conventional molecular weight-controlling agent, e.g., non-conjugated dienes such as cyclooctadiene and allene or $\alpha$-olefins.

In the second stage of the process of the present invention, without deactivating the remaining cis-1,4-polymerization catalyst and with addition or no addition of 1,3-butadiene and/or an inert organic solvent to the polymerization mixture comprising cis-1,4-polybutadiene, the remaining cis-1,4-polymerization catalyst, 1,3-butadiene, and an inert organic solvent, the 1,2-polymerization of 1,3-butadiene is effected by adding thereto the 1,2-polymerization catalyst comprising components ($a'$), ($b'$), ($c'$) and, if desired, ($d'$), when the component ($a'$) is not the same as the component ($a$) of the cis-1,4-polymerization catalyst employed; or by adding to the polymerization system either all the components of the 1,2-polymerization catalyst or the components of the 1,2-polymerization catalyst except component ($a'$) when the component ($a'$) is the same as the component ($a$) of said cis-1,4-polymerization catalyst employed.

The 1,2-polymerization catalyst is obtained from a cobalt component ($a'$), an organoaluminum compound ($b'$), carbon disulfide ($c'$) and, if desired, a nitrile compound ($d'$). The cobalt component ($a'$) is a cobalt compound ($a'_1$) or a material ($a'_2$) formed by electrochemically depositing metallic cobalt on metallic zinc, each of which is such as described hereinbefore for ($a_1$) or ($a_2$) of the cobalt component ($a$) of the cis-1,4-polymerization catalyst.

The organoaluminum compound of component ($b'$) which is represented by the formula $AlR_3$ suitably includes, for example, trimethylaluminum, triethylaluminum, tributylaluminum, triphenylaluminum and the like. The carbon disulfide of component ($c'$) is not particularly critical, but those which do not contain moisture are suitable.

The nitrile compound ($d'$), the use of which is optional, is one represented by the formula $R'(CN)_m$ as specified hereinbefore. The nitrile compound preferably includes for example acetonitrile, adiponitrile, sebaconitrile, benzonitrile and phenylacetonitrile.

The amount of the components of the 1,2-polymerization catalyst used varies depending upon the particular catalyst component, the combination and the polymerization conditions, as is also true in the aforesaid cis-1,4-polymerization. When the cobalt compound ($a'_1$) is used as the cobalt component ($a'$), it is preferred to employ 0.001 to 10 millimoles particularly 0.005 to 5 millimoles of the cobalt compound ($a'_1$) together with 0.1 to 100 millimoles, particularly 0.5 to 50 millimoles of the organoaluminum compound ($b'$)

and 0.001 to 20 millimoles, more suitably 0.005 to 10 millimoles of carbon disulfide ($c'$), each per mole of 1,3-butadiene, and, if desired, the nitrile compound ($d'$) is used in an amount such that the molar ratio [$R'(CN)_m/Al$] of the nitrile compound ($d'$) to the organoaluminum compound ($b'$) is 0.1 to 30, more suitably 0.2 to 15. The molar ratio (Al/Co) of the organoaluminum compound ($b'$) to the cobalt compound ($a'_1$) is 5 to 500 and more suitably 15 to 100. When the material ($a'_2$) formed by electrochemically depositing metallic cobalt on metallic zinc is used as component ($a'$), it is preferred to employ 0.05 to 10 g of the material ($a'_2$) per 100 g of 1,3-butadiene together with the other components ($b'$), ($c'$) and, if desired, ($d'$), the amounts of these components are the same as those mentioned above. The amount of the organoaluminum compound ($b'$) is suitably 0.1 to 5.0 times the material ($a'_2$) by weight.

In case the cobalt component ($a'$) of the 1,2-polymerization catalyst is identical with the cobalt component ($a$) of the cis-1,4-polymerization catalyst, the total amounts of these required for the two polymerizations, may be added at the same time in the first step and further, the other components of the 1,2-polymerization catalyst are only added in the second step.

The order of the addition of the 1,2-polymerization catalyst components is not particularly critical, but, in the case where the nitrile compound ($d'$) is used, the nitrile compound ($d'$) should preferably be added before the addition of carbon disulfide ($c'$). It is preferred, for example, in the case where the nitrile compound ($d'$) is used in the second step, to first add the organoaluminum compound ($b'$) and, if desired, the cobalt component ($a'$) to the polymerization mixture, and then the nitrile compound ($d'$) and finally the carbon disulfide ($c'$).

By changing the amount of the nitrile compound ($d'$) added, the melting point of the 1,2-structure portion of the resulting polybutadiene may be suitably varied within the range of 110° to 215°C. It is preferred, in view of the physical property of the final rubber product to control the melting point to the range of 110° to 215°C, most suitably 160° to 215°C.

The 1,2-polymerization may be suitably carried out at a temperature of −20° to 80°C, particularly 5° to 50°C, under atmospheric pressure or a high pressure, over a period of 10 minutes to 10 hours. The concentration of 1,3-butadiene is suitably 3 to 40% by weight, based on the weight of the polymerization mixture. An inert organic solvent used in the 1,2-polymerization is also not particularly critical and may be selected from those listed above and particularly that portion of the description referring to the cis-1,4-polymerization solvent.

The 1,2-polymerization catalyst used in the process of the present invention is the same as those disclosed in U.S. Pat. application No. 94019. When the catalyst consisting essentially of the cobalt component ($a'$), the organoaluminum compound ($b'$) and carbon disulfide ($c'$) is solely used for the polymerization of 1,3-butadiene, syndiotactic 1,2-polybutadiene having a very high melting point ranging from 200° to 215°C and high 1,2-structure content is obtainable. When a catalyst consisting essentially of the above three components ($a'$), ($b'$) and ($c'$) and the nitrile compound ($d'$) is used, syndiotactic 1,2-polybutadiene having a melting point ranging from 100° to 210°C and a high 1,2-structure content is obtainable.

In carrying out the process of the present invention, all the amounts of 1,3-butadiene and the solvent required may be added at the cis-polymerization stage, or a part of the 1,3-butadiene and/or the solvent may be added at the cis-polymerization stage, the remainder being added at the 1,2-polymerization stage. The concentration of 1,3-butadiene in the 1,2-polymerization system is suitably within the range of 3 to 40% by weight, as mentioned above. Both the cis-1,4-polymerization and 1,2-polymerization can be carried out either batchwise in one reactor or continuously in separate zones, i.e. cis-1,4-polymerization zone and successive 1,2-polymerization zone.

After the completion of the 1,2-polymerization, polybutadiene can be recovered in a conventional manner. For example, at the end of the 1,2-polymerization, a short stopper may be put into the polymerization mixture to terminate the polymerization and then, the polymer is precipitated by adding a precipitating agent such as methanol, acetone, and the like, or recovered by flashing the polymer solution, i.e., evaporating the polymerization solvent with or without blowing steam thereinto and then, the separated polymer is dried.

The polybutadiene so obtained is characterized as having a microstructure consisting essentially of 2 to 40%, preferably, 5 to 25%, and most preferably, 7 to 20%, of a 1,2-structure and 60 to 98%, preferably 75 to 95%, and most preferably, 80 to 93% of a cis-1,4-structure and an intrinsic viscosity [$\eta$] in tetraline at 135°C of 0.9 to 8, preferably 1.2 to 5. The 1,2-structure portion of the resulting polybutadiene is characterized as having a melting point of 110° to 215°C, preferably 160° to 215°C.

The distinct feature of the present invention is, as mentioned above, that 1,3-butadiene is first cis-1,4-polymerized in the presence of the specified cis-1,4-polymerization catalyst, the amount thereof being such that the final polybutadiene contains 60 to 98% of the cis-1,4-structure, until the intrinsic viscosity [$\eta$]$_{toluene}^{30}$ $^c$ of the polymer reaches the range of 1.5 to 8, and successively, 1,2-polymerized in the presence of the novel 1,2-polymerization catalyst until the polymer having a 1,2-structure content of 2 to 40% and a cis-1,4-structure content of 60 to 98% and an intrinsic viscosity [$\eta$]$_{tetraline}^{135}$ $^c$ of 0.9 to 8 is obtained. The polybutadiene so obtained has the above-mentioned microstructure resulting in rubber products which have a remarkably improved tear strength and flex-crack resistance while substantially retaining the excellent properties of high cis-1,4-polybutadiene such as abrasion resistance.

It is difficult to characterize exactly the structure of the polybutadiene prepared by the process of the present invention, but it seems that the polybutadiene contains a bonded polymer of cis-1,4-polybutadiene and 1,2-polybutadiene as well as cis-1,4-polybutadiene and syndiotactic 1,2-polybutadiene from the results of the fractionation test set forth in Reference Example 1, and the comparison between the physical properties of polybutadienes in Comparative Examples 1 to 3 and the Examples. That is, as shown in Reference Example 1, although a blend of cis-1,4-polybutadiene and syndiotactic 1,2-polybutadiene can be separated by fractionation into cis-1,4-polybutadiene and syndiotactic 1,2-polybutadiene, the polybutadiene obtained by the process of the present invention cannot be clearly separated by the same fractionation method into cis-1,4-polybutadiene and 1,2-polybutadiene. Furthermore, a comparison between the physical properties of rubber products made from a blend of cis-1,4-polybutadiene and syndiotactic 1,2-polybutadiene and from the polybutadiene obtained by the process of the present invention clearly indicates that both the rubber products greatly differ in their properties from each other. In particular, the rubber product from the polybutadiene of the present invention has a far greater improved tear strength, flex-crack resistance and tensile strength, although the contents of the cis-1,4-structure and 1,2-structure are nearly the same for both products.

Polybutadiene which is capable of being made by vulcanization to a rubber product exhibiting such excellent properties could not have been heretofore produced by any known methods, i.e., the process of the present invention is the first one to enable the production of such improved products.

The polybutadiene obtained by the process of the present invention may be compounded with known ingredients conventionally used for natural rubber or cis-1,4-polybutadiene, such as a vulcanizing agent, a vulcanizing accelerator, a reinforcing agent, a filler, an antioxidant, a pigment, a process oil, and the like. The compound may be kneaded, shaped and vulcanized, in a manner known per se, for making the desired products. It also may be kneaded with an extender oil to make an oil extended rubber product.

The polybutadiene rubber products obtained from the polybutadiene produced by the process of the present invention particularly exhibit improved tear strength and flexcrack resistance and, consequently, can be made into a tires and other similar rubber products which do not readily chip. The polybutadiene obtained by the process according to the present invention may be blended with a natural rubber or synthetic rubbers.

The invention will be further illustrated in the following Examples and Comparative Examples in which all "parts" and "%" are parts and %, both by weight. In these Examples, the microstructure of polybutadiene is determined by an infrared absorption spectrum analysis in accordance with R. Humpton; Analytical Chemistry, 21, 923 (1949).

The intrinsic viscosity [$\eta$] of the cis-1,4-polymerized polymer and 1,2-polymerized polymer was determined in toluene at 30°C and in tetraline at 135°C, respectively, unless otherwise specified.

Physical properties of the vulcanized product of the final polymer were determined in accordance with Japanese Industrial Standard K-6301. Tear strength was measured on a B-type test specimen defined in Japanese Industrial Standard K-6301. The flex-crack resistance means the resistance to crack growth when subjected to repeated bend flexing and was designated as the number of cycles required for the crack length increasing from 2 mm to 15 mm.

EXAMPLE 1

A 30 l stainless steel reactor equipped with a stirrer, into which nitrogen gas had been blown to replace the air, was charged with a solution of 1.6 kg of 1,3-butadiene in 18 kg of dehydrated benzene, followed by the addition of 4 m-mole of cobalt octoate, 84 m-mole of diethylaluminum monochloride and 70 m-mole of 1,5-cyclooctadiene (referred to hereinafter as "COD" for brevity). The mixture was stirred for 30 minutes with the temperature being maintained at 25°C to effect the cis-1,4-polymerization. The resultant polymer exhibited an intrinsic viscosity [$\eta$] of 2.1. Analysis of its microstructure indicated that it contained 98.2% of the cis-1,4-structure, 1.0% of the trans-1,4-structure and 0.8% of the 1,2-structure. Then, 90 m-mole of triethylaluminum and 50 m-mole of carbon disulfide were added to the polymerization system, followed by agitation over a period of 60 minutes with the temperature being maintained at 25°C to effect the 1,2-polymerization. The reaction mixture was poured into 18 l of methanol containing 1% of phenyl-$\beta$-naphthylamine to precipitate a rubbery polymer. The rubbery polymer was separated, washed with methanol, and dried at room temperature and in vacuo.

Conversion to the polybutadiene so produced was 80%. The polybutadiene had an intrinsic viscosity [$\eta$] of 1.55 and a Mooney viscosity of 53ML$_{1+4}$. Analysis of its microstructure indicated that it contained 8.1% of the 1,2-structure having a melting point of 207°C, 1.1% of the trans-1,4-structure and 90.8% of the cis-1,4-structure.

The polybutadiene was compounded by rolls in accordance with the following composition and vulcanized at 140°C for 40 minutes.

| Composition | |
|---|---|
| Polybutadiene | 100 parts |
| Oil ("Esso Bl" naphthenic process oil) | 8 parts |
| Zinc oxide | 5 parts |
| Stearic acid | 3 parts |
| Antioxidant (phenyl-$\beta$-naphthylamine) | 1 part |
| HAF carbon | 50 parts |
| Vulcanization accelerator CZ (cyclohexyl-benzothiazyl sulfenamide) | 1 part |
| Sulfur | 1.5 parts |

The physical properties of the vulcanized rubber product are shown in Table 2.

EXAMPLE 2

The procedure of the cis-1,4-polymerization set forth in Example 1 was repeated with all the conditions remaining the same. Immediately after the cis-1,4-polymerization, 100 m-mole of triethylaluminum and 350 m-mole of acetonitrile, and then 50 m-mole of carbon disulfide were added to the polymerization system, followed by agitation over a period of 120 minutes with the temperature being maintained at 25°C to effect the 1,2-polymerization. The resultant polymer was recovered by the same procedure as that described in Example 1.

Conversion to the polybutadiene was 82%. The polybutadiene had an intrinsic viscosity [$\eta$] of 1.5 and a Mooney viscosity of 56ML$_{1+4}$. Analysis of its microstructure indicated that it contained 10.3% of the 1,2-structure having a melting point of 183°C, 1.1% of the trans-1,4-structure and 88.6% of the cis-1,4-structure.

The polybutadiene was compounded and vulcanized in accordance with the same procedure and conditions as set forth in Example 1. The physical properties of the vulcanized rubber product are shown in Table 2.

COMPARATIVE EXAMPLES 1 – 4

For the sake of comparison, the following four polybutadienes were separately compounded in accordance with the composition mentioned in Example 1 and vulcanized at 140°C for 40 minutes.

1. A blend of 91 parts of a commercially available high cis-1,4-polybutadiene and 9 parts of 1,2- polybutadiene produced by the process described in U.S. Pat. application No. 94019 having a melting point of 207°C (Comparative Example 1).

2. A blend of 90 parts of the same high cis-1,4-polybutadiene as that of Comparative Example 1 and 10 parts of 1,2-polybutadiene produced by the process described in U.S. Pat. application No. 94019 having a melting point of 183°C (Comparative Example 2).

3. A commercially available high cis-1,4-polybutadiene (Comparative Example 3).

4. Polybutadiene (A) produced by the process described in Example 1 of U.S. Pat. No. 3,595,850, the process involving the two steps of: first, polymerizing 1,3-butadiene in the presence of a trans-1,4-polymerization catalyst and secondly, continuing the polymerization of same in the presence of a cis-1,4-polymerization catalyst (Comparative Example 4).

The microstructure and intrinsic viscosity $[\eta]$ of the above polybutadienes are shown in Table 1. Physical properties of the vulcanized rubber products are shown collectively with those of Examples 1 and 2 in Table 2.

As is evident from Table 2, a rubber product from the polybutadiene produced by the process of the present invention is far superior in tear strength, tensile strength and flex-crack resistance as compared with other synthetic polybutadienes.

REFERENCE EXAMPLE 1

In order to clarify the structure of the polybutadiene produced by the process of the present invention, a fractionation test was conducted on the polybutadienes obtained in Examples 1 and 2 and the blends of Comparative Examples 1 and 2. The test was conducted in accordance with the following procedure.

Five grams of the sample polybutadiene was dissolved in 200 cc of a mixture of n-heptane and xylene (1 : 1) at a temperature of 60° to 70°C and the solution was cooled to a temperature of approximately −20°C to precipitate part of the polybutadiene. The slurry so obtained was subjected to a centrifugal separation at a temperature of 0° to 10°C to effect separation of a precipitate from the solution. The precipitate was dried. The solution was poured into a large quantity of methanol to precipitate polybutadiene, followed by drying. The microstructure of polybutadienes from the precipitate and solution was determined. The results are shown in Table 3.

Table 1

| Comparative Example No. | | Polymer | Intrinsic viscosity $[\eta]$ | Microstructure | | |
|---|---|---|---|---|---|---|
| | | | | Cis-1,4 | Trans-1,4 | 1,2 |
| 1 | Blend | cis-1,4-polybutadiene | 2.2 | 97.8 | 1.2 | 1.0 |
| | | 1,2-polybutadiene | 1.5* | 0.7 | 0.5 | 98.8 |
| 2 | Blend | cis-1,4-polybutadiene | 2.2 | 97.8 | 1.2 | 1.0 |
| | | 1,2-polybutadiene | 1.5* | 3.5 | 0.7 | 95.8 |
| 3 | | High cis-1,4-polybutadiene | 2.2 | 98.0 | 0.9 | 1.1 |
| 4 | | Polybutadiene (A) | 2.4 | 79.7 | 19.3 | 1.0 |

*determined in tetraline at 135°C

Table 3

| Specimen polybutadiene | Microstructure | | | | | |
|---|---|---|---|---|---|---|
| | Cis-1,4-structure (%) | | Trans-1,4-structure | | 1,2-structure (%) | |
| | Precipitate portion | Solution portion | Precipitate portion | Solution portion | Precipitate portion | Solution portion |
| Example 1 | 30.4 | 93.1 | 0.9 | 1.0 | 68.7 | 5.9 |
| Comparative Example 1 | 1.0 | 96.9 | 0.5 | 1.3 | 98.5 | 1.8 |
| Example 2 | 32.5 | 91.0 | 1.0 | 1.0 | 66.5 | 7.9 |
| Comparative Example 2 | 5.2 | 96.8 | 0.7 | 1.4 | 94.1 | 1.8 |

As is evident from Table 3, both the blends of high cis-1,4-polybutadiene and the 1,2-polybutadiene can Table 2

| | Modulus at 300% elongation (kg/cm²) | Elongation (%) | Tensile strength (kg/cm²) | Tear strength (kg/cm) | Impact resilience (%) | Flex-crack resistance (cycles) |
|---|---|---|---|---|---|---|
| Example 1 | 161 | 400 | 220 | 64 | 56 | 30,000 |
| Comparative Example 1 | 110 | 410 | 190 | 36 | 54 | 6,000 |
| Example 1 | 158 | 430 | 220 | 66 | 56 | 37,000 |
| Comparative Example 2 | 120 | 400 | 190 | 38 | 53 | 6,000 |
| Comparative Example 3 | 100 | 430 | 180 | 31 | 65 | 4,000 |
| Comparative Example 4 | 110 | 440 | 200 | 43 | 63 | 6,000 | be clearly separated into the respective components. However, the polybutadiene produced by the process of the present invention cannot be clearly separated into high cis-1,4-polybutadiene and 1,2-polybutadiene, i.e., there are only 68.7% and 66.5% of the 1,2-structure in the precipitate portion of the invention polybutadienes, and these are far less than the contents of the 1,2-structure, "98.5%" and "95.8%", respectively, in the polybutadienes obtained by the processes involving the use of (1) the catalyst system consisting of cobalt octoate, triethylaluminum and carbon disulfide and (2) the catalyst system consisting of the three compounds plus acetonitrile, respectively. This result shows that the polybutadiene produced by the process of the present invention, at least partially contains a bonded polymer between the cis-1,4-polybutadiene and the 1,2-polybutadiene.

EXAMPLES 3 – 14

The procedures of Examples 1 and 2 were repeated wherein the catalyst components for the cis-1,4-polymerization as enumerated below were used instead of cobalt octoate and diethylaluminum monochloride was all other conditions remaining the same.

| Example No. | Cis-1,4-polymerization catalyst components | |
|---|---|---|
| | Cobalt compound | Halogen-containing organoaluminium compound |
| 3,4 | Cobalt naphthenate | Diethylaluminium monochloride |
| 5,6 | Cobalt octoate | Dibutylaluminium monochloride |
| 7,8 | Cobalt octoate | Diethylaluminium monobromide |
| 9,10 | Cobalt triacetylacetonate | Diethylaluminium monochloride |
| 11,12 | Cobalt triacetylacetonate | Ethylaluminium sesquichloride |
| 13,14 | Cobalt chloride-pyridine complex | Diethylaluminium monochloride |

Note: The 1,2-polymerization catalysts in Examples 3, 5, 7, 9, 11 and 13 were the same as the catalyst used in Example 1, and the catalysts employed in Examples 4, 6, 8, 10, 12 and 14 were the same as that employed in Example 2.

Conversion to polybutadiene, the intrinsic viscosity [$\eta$], the microstructure, the Mooney viscosity ($ML_{1+4}$) and the melting point of the 1,2-structure portion are shown in Table 4.

Table 5

| Ex. No. | Modulus at 300% elongation ($kg/cm^2$) | Elongation (%) | Tensile strength ($kg/cm^2$) | Tear strength (kg/cm) | Impact resilience (%) | Flex-crack-resistance (cycles) |
|---|---|---|---|---|---|---|
| 3 | 158 | 420 | 210 | 62 | 56 | 32,000 |
| 4 | 166 | 420 | 220 | 66 | 55 | 37,000 |
| 5 | 153 | 420 | 200 | 60 | 57 | 28,000 |
| 6 | 149 | 440 | 230 | 63 | 56 | 36,000 |
| 7 | 154 | 410 | 210 | 63 | 55 | 35,000 |
| 8 | 165 | 430 | 220 | 66 | 54 | 37,000 |
| 9 | 164 | 400 | 220 | 65 | 54 | 40,000 |
| 10 | 179 | 420 | 240 | 69 | 53 | 40,000 |
| 11 | 160 | 400 | 230 | 64 | 54 | 40,000 |
| 12 | 164 | 420 | 230 | 68 | 53 | 38,000 |
| 13 | 150 | 430 | 200 | 58 | 58 | 28,000 |
| 14 | 158 | 430 | 220 | 63 | 55 | 37,000 |

EXAMPLES 15 and 16

The procedures of Example 1 and 2 were repeated in Examples designated herein as Examples 15 and 16, respectively wherein 15 g of the material prepared by electrochemically depositing metallic cobalt on metallic zinc was used instead of cobalt octoate and the amount of diethylaluminum monochloride used was 150 m-mole instead of 84 m-mole and further, 2 m-mole of cobalt naphthenate was added when the 1,2-polymerization of butadiene was commenced, with all other conditions remaining same. In Example 15, the amount of COD was 60 m-mole instead of 70 m-mole. The material used herein as a cobalt component of the cis-1,4-polymerization catalyst was prepared as follows; 51 g of cobalt chloride ($CoCl_2 \cdot 6H_2O$) was dissolved in 600 cc of water, followed by the addition of 150 g of metallic zinc powder. After the mixture was stirred at 25°C for 2 hours, the solid material was filtered off and dried to obtain the material, which contained 18% of metallic cobalt.

The polybutadiene after the cis-1,4-polymerization had a microstructure consisting of 98.0% of the cis-1,4-structure, 1.1% of the trans-1,4-structure and 0.9% of the 1,2-structure.

The characteristics of the final polybutadienes and physical properties of the vulcanized rubber products made therefrom employing the same procedure described in Example 1 are shown in Tables 6 and 7, respectively.

Table 4

| Ex. No. | Amount of COD added (m-mole) | Intrinsic viscosity [$\eta$] | | Conversion (%) | Mooney viscosity $ML_{1+4}$ | Melting point (°C) | Microstructure (%) | | | | | |
|---|---|---|---|---|---|---|---|---|---|---|---|---|
| | | After cis-1,4-polymerization | After 1,2-polymerization | | | | after cis-1,4-polymerization | | | after 1,2-polymerization | | |
| | | | | | | | Cis-1,4 | Trans-1,4 | 1,2 | Cis-1,4 | Trans-1,4 | 1,2 |
| 3 | 70 | 2.2 | 1.6 | 75 | 56 | 205 | 98.0 | 1.0 | 1.0 | 90.8 | 1.0 | 8.2 |
| 4 | 70 | 2.2 | 1.6 | 77 | 58 | 181 | 98.0 | 1.0 | 1.0 | 88.5 | 1.0 | 10.5 |
| 5 | 70 | 1.9 | 1.3 | 72 | 50 | 205 | 97.4 | 1.5 | 1.1 | 91.3 | 0.9 | 7.8 |
| 6 | 70 | 1.9 | 1.3 | 75 | 54 | 182 | 97.4 | 1.5 | 1.1 | 88.2 | 0.9 | 9.9 |
| 7 | 60 | 2.0 | 1.4 | 68 | 52 | 204 | 97.0 | 1.7 | 1.3 | 90.5 | 1.0 | 8.5 |
| 8 | 60 | 2.0 | 1.4 | 71 | 53 | 180 | 97.0 | 1.7 | 1.3 | 88.2 | 1.0 | 10.8 |
| 9 | 70 | 2.2 | 1.65 | 81 | 60 | 205 | 98.0 | 1.0 | 1.0 | 89.1 | 1.0 | 9.9 |
| 10 | 70 | 2.2 | 1.6 | 84 | 65 | 185 | 98.0 | 1.0 | 1.0 | 86.6 | 1.0 | 12.4 |
| 11 | 41 | 1.8 | 1.3 | 77 | 53 | 203 | 97.0 | 1.5 | 1.5 | 89.5 | 1.0 | 9.5 |
| 12 | 41 | 1.8 | 1.3 | 80 | 57 | 178 | 97.0 | 1.5 | 1.5 | 86.9 | 1.0 | 12.1 |
| 13 | 22 | 1.9 | 1.4 | 62 | 50 | 201 | 97.8 | 1.2 | 1.0 | 91.5 | 0.9 | 7.6 |
| 14 | 22 | 1.9 | 1.4 | 66 | 53 | 177 | 97.8 | 1.2 | 1.0 | 88.6 | 0.9 | 10.5 |

These polybutadienes were compounded and vulcanized in the same manner as that described in Example 1. The physical properties of the vulcanized rubber products are shown in Table 5.

EXAMPLES 17 and 18

The procedures employed in Examples 15 and 16 were repeated wherein cobalt naphthenate used as a cobalt component of the 1,2-polymerization catalyst was not used at all with all other conditions remaining the same, such procedures being used in Examples 17 and 18, respectively.

The characteristics of the resultant polybutadienes and physical properties of the vulcanized rubber products made therefrom employing the same procedures described in Example 1 are shown in Tables 6 and 7, respectively.

EXAMPLES 19 and 20

The procedures of Examples 9 and 10 were repeated wherein triisobutylaluminum was used as one component of the 1,2-polymerization catalyst instead of triethylaluminum with all other conditions remaining the same, such procedure being used in Examples 19 and 20, respectively.

The characteristics of the resultant polybutadienes and physical properties of the vulcanized rubber products made therefrom using the same procedure as described in Example 1 are shown in Tables 6 and 7, respectively.

EXAMPLES 21 and 22

The procedures of Examples 1 and 2 were repeated wherein 2 m-mole of cobalt octoate was added when 1,3-butadiene was cis-1,4-polymerized and a further 2 m-mole of cobalt octoate, was added when 1,3-butadiene was 1,2-polymerized with all other conditions remaining the same, the last mentioned Examples being herein designated as Examples 21 and 22, respectively. This is in contrast to Examples 1 and 2 where 4 m-mole of cobalt octoate were added at the time when 1,3-butadiene was cis-1,4-polymerized.

The characteristics of the resultant polybutadienes and physical properties of the vulcanized rubber products made therefrom in the same manner as that of Example 1 are shown in Tables 6 and 7, respectively.

EXAMPLES 23 - 28

The procedures of Examples 1 and 2 were repeated wherein the temperature of the 1,2-polymerization and the amount of COD added were varied as shown in Table 6 with all other conditions remaining the same. The other conditions of the 1,2-polymerization set forth in Examples 23, 25 and 27 are the same as Example 1 and the conditions and procedure employed in Examples 24, 26 and 28 are the same as those set forth in Example 2.

The characteristics of the resultant polybutadienes in the above Examples 23 - 28 and physical properties of the vulcanized rubber products made therefrom using the same procedure as that employed in Example 1 are collectively shown in Tables 6 and 7, respectively.

Table 6

| Ex. No. | Amount of COD added (m-mole) | 1,2-polymerization conditions Temp. (°C) | 1,2-polymerization conditions Time (min) | Intrinsic viscosity $[\eta]$ After cis-1,4-polymerization | Intrinsic viscosity $[\eta]$ After 1,2-polymerization | Conversion (%) | Mooney viscosity $ML_{1+4}$ | Melting point (°C) | Microstructure (%) Cis-1,4 | Microstructure (%) Trans-1,4 | Microstructure (%) 1,2 |
|---|---|---|---|---|---|---|---|---|---|---|---|
| 15 | 60 | 25 | 60 | 2.0 | 1.4 | 66 | 53 | 203 | 90.0 | 1.2 | 8.8 |
| 16 | 70 | 25 | 120 | 2.0 | 1.4 | 69 | 55 | 180 | 87.8 | 1.2 | 11.0 |
| 17 | 60 | 25 | 60 | 2.0 | 1.45 | 65 | 49 | 200 | 90.7 | 1.2 | 8.1 |
| 18 | 70 | 25 | 120 | 2.0 | 1.4 | 67 | 51 | 176 | 88.6 | 1.2 | 10.2 |
| 19 | 70 | 25 | 60 | 2.2 | 1.6 | 75 | 58 | 205 | 89.8 | 1.0 | 9.2 |
| 20 | 70 | 25 | 120 | 2.2 | 1.6 | 79 | 64 | 181 | 86.6 | 1.0 | 12.4 |
| 21 | 70 | 25 | 60 | 2.3 | 1.7 | 73 | 63 | 205 | 87.5 | 1.1 | 11.4 |
| 22 | 70 | 25 | 120 | 2.3 | 1.7 | 77 | 69 | 182 | 83.8 | 1.1 | 15.1 |
| 23 | 70 | 45 | 60 | 2.1 | 1.4 | 82 | 48 | 185 | 87.8 | 1.4 | 10.8 |
| 24 | 70 | 25 | 120 | 2.1 | 1.4 | 84 | 51 | 167 | 85.3 | 1.4 | 13.3 |
| 25 | 0 | 25 | 60 | 4.7 | 3.8 | 79 | 84 | 206 | 90.7 | 1.1 | 8.2 |
| 26 | 0 | 25 | 120 | 4.7 | 3.6 | 83 | 91 | 177 | 88.0 | 1.1 | 10.9 |
| 27* | 70 | 25 | 90 | 2.1 | 1.4 | 53 | 64 | 205 | 83.1 | 1.5 | 15.4 |
| 28* | 70 | 25 | 150 | 2.1 | 1.4 | 55 | 69 | 174 | 80.5 | 1.5 | 18.0 |

*Note: 0.8 kg of 1,3-butadiene was added in addition when 1,2-polymerized.

Table 7

| Ex. No. | Modulus at 300% elongation (kg/cm²) | Elongation (%) | Tensile strength (kg/cm²) | Tear strength (kg/cm) | Impact resilience (%) | Flex-crack resistance (cycles) |
|---|---|---|---|---|---|---|
| 15 | 156 | 400 | 210 | 63 | 55 | 36,000 |
| 16 | 170 | 430 | 240 | 68 | 54 | 40,000 |
| 17 | 145 | 410 | 210 | 62 | 56 | 30,000 |
| 18 | 154 | 440 | 220 | 62 | 56 | 34,000 |
| 19 | 166 | 390 | 210 | 64 | 55 | 40,000 |
| 20 | 169 | 400 | 230 | 67 | 53 | 40,000 |
| 21 | 185 | 370 | 220 | 64 | 54 | 40,000 |
| 22 | 171 | 400 | 230 | 65 | 52 | 40,000 |
| 23 | 178 | 390 | 230 | 66 | 54 | 36,000 |
| 24 | 166 | 420 | 210 | 61 | 54 | 29,000 |
| 25* | 141 | 450 | 200 | 58 | 52 | 34,000 |
| 26* | 155 | 440 | 210 | 64 | 57 | 34,000 |
| 27 | 182 | 350 | 200 | 64 | 51 | 38,000 |
| 28 | 179 | 360 | 210 | 65 | 51 | 34,000 |

*Note: The rubber products were extended with 37.5 PHR of aromatic oil (No. 3 made by Fuji Kosan K. K., Japan).

EXAMPLES 29 – 35

The procedure of Example 2 was repeated wherein the nitrile compounds as shown in Table 8 were used as one component of the 1,2-polymerization catalyst instead of 350 m-mole of acetonitrile with all other conditions remaining the same. The amounts of the nitrile compounds were also indicated in Table 8.

Characteristics of the resultant polybutadienes and physical properties of the vulcanized rubber products made therefrom in the same manner as that of Example 2 are shown in Tables 8 and 9, respectively.

Table 8

| Ex. No. | Nitrile compound | Amount (m-mole) | Intrinsic viscosity [$\eta$] After cis-1,4-polymerization | After 1,2-polymerization | Conversion (%) | Mooney viscosity $ML_{1+4}$ | Melting point (°C) | Microstructure (%) Cis-1,4 | Trans-1,4 | 1,2 |
|---|---|---|---|---|---|---|---|---|---|---|
| 29 | Benzonitrile | 350 | 2.1 | 1.5 | 82 | 54 | 185 | 88.9 | 1.0 | 10.1 |
| 30 | Sebaconitrile | 350 | 2.1 | 1.5 | 83 | 55 | 178 | 88.4 | 1.1 | 10.5 |
| 31 | Adiponitrile | 350 | 2.1 | 1.5 | 82 | 52 | 183 | 88.7 | 1.1 | 10.2 |
| 32 | Phenylacetonitrile | 350 | 2.1 | 1.5 | 81 | 51 | 180 | 88.8 | 1.1 | 10.1 |
| 33 | Acetonitrile | 100 | 2.1 | 1.5 | 82 | 54 | 198 | 88.0 | 1.1 | 10.9 |
| 34 | Acetonitrile | 1000 | 2.1 | 1.4 | 77 | 48 | 148 | 91.8 | 1.1 | 7.1 |
| 35* | Acetonitrile | 800 | 2.1 | 1.4 | 89 | 78 | 175 | 76.3 | 1.4 | 22.3 |

*Note: 200 m-mole of triethylaluminum was used in Example 35.

Table 9

| Ex. No. | Modulus at 300% elongation (kg/cm²) | Elongation (%) | Tensile strength (kg/cm²) | Tear strength (kg/cm) | Impact resilience (%) | Flex-crack resistance |
|---|---|---|---|---|---|---|
| 29 | 146 | 430 | 220 | 65 | 55 | 36,000 |
| 30 | 152 | 420 | 220 | 64 | 56 | 34,000 |
| 31 | 156 | 420 | 230 | 65 | 56 | 36,000 |
| 32 | 155 | 430 | 220 | 66 | 56 | 34,000 |
| 33 | 163 | 410 | 230 | 65 | 55 | 38,000 |
| 34 | 124 | 450 | 200 | 44 | 61 | 9,000 |
| 35 | 180 | 310 | 190 | 57 | 48 | 25,000 |

What we claim is:

1. A process for the production of polybutadiene consisting of 2–40% of the 1,2-cis structure, 60–98% of the cis-1,4-structure and not more than 1.5% of the trans-1,4-structure which comprises the two successive steps of:

first, polymerizing for a period of time ranging between a period of ten minutes and 10 hours, 1,3-butadiene in an inert organic solvent in the presence of a cis-1,4-polymerization catalyst consisting essentially of a. a cobalt component selected from the group consisting of ($a_1$) a cobalt compound and ($a_2$) a material formed by electrochemically depositing metallic cobalt on metallic zinc, and b. a halogen-containing organoaluminum compound represented by the formula wherein R is an alkyl or cycloalkyl group having 1 to 6 carbon atoms or a phenyl group, X is a halogen atom and $n$ is a positive number in the range of 1.5 to 2.0 thereby forming cis-1,4-polybutadiene, and secondly, without deactivating the remaining cis-1,4-polymerization catalyst and with the addition or no addition of 1,3-butadiene and/or an inert organic solvent to the polymerization system, effecting the 1,2-polymerization of 1,3-butadiene, (A) in the case where the following component ($a'$) is not the same as component ($a$) of the cis-1,4-polymerization catalyst employed, by adding thereto, without deactivating the remaining cis-1,4-polymerization catalyst, a 1,2-polymerization catalyst comprising a'. a cobalt component selected from the group consisting of ($a'_1$) a cobalt compound and ($a'_2$) a material formed by electrochemically depositing metallic cobalt on metallic zinc, b'. an organoaluminum compound represented by the formula $$AlR_3 \qquad (2)$$

wherein R represents the group defined hereinbefore, and c'. carbon disulfide, when the component ($a'$) is not the same as the component ($a$) of the cis-1,4-polymerization catalyst employed, or, B. in the case where the component ($a'$) is the same as the component ($a$) of the cis-1,4-polymerization catalyst employed, by adding to the polymerization system, without deactivating the remaining cis-1,4-polymerization catalyst, either (B1) all the components of said 1,2-polymerization catalyst or (B2) the components of said 1,2-polymerization catalyst except component ($a'$) when the component ($a'$) is the same as the component ($a$) of said cis-1,4-polymerization catalyst employed, the aforesaid 1,2-polymerization being conducted for a period of time varying between ten minutes and ten hours, thereby forming the desired polybutadiene product, in which said cobalt compound of ($a_1$) and ($a'_1$) is a member selected from the group consisting of i. a cobalt salt of a carboxylic acid having 6 to 10 carbon atoms, ii. a cobalt complex of a $\beta$-diketone represented by the formula:

wherein each of $R_1$ and $R_4$ is an alkyl group having 1 to 3 carbon atoms and each of $R_2$ and $R_3$ is a hydrogen atom or an alkyl group having 1 to 3 atoms, iii. a cobalt complex of a β-keto acid ester represented by the formula

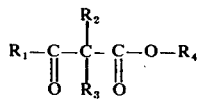
(4)

wherein $R_1$, $R_2$, $R_3$ and $R_4$ are as defined in preceding formula (3), and iv. a cobalt halide complex prepared from a cobalt halide represented by the formula $CoXn$ wherein X is a halogen atom and $n$ is 2 or 3 and a ligand capable of forming a complex in coordination with the cobalt halide, selected from the group consisting of tertiary amines, alcohols, tertiary phosphines, ketones and N,N-dialkylamides, said cis-1,4-polymerization catalyst containing 0.002 to 50 millimoles of the cobalt compound ($a_1$) and 0.2 to 200 millimoles of the halogen-containing organoaluminum compound (b), per each mole of 1,3-butadiene, and the molar ratio (Al/Co) of the halogen-containing organoaluminum compound (b) to the cobalt compound ($a_1$) being 5 to 500, or containing 0.025 to 5 g of the material ($a_2$) formed by electrochemically depositing metallic cobalt on metallic zinc per 100 g of 1,3-butadiene and 0.1 to 5 times the weight of the material ($a_2$), of the halogen-containing organoaluminum compound (b), and said 1,2-polymerization catalyst containing 0.001 to 10 millimoles of the cobalt compound ($a'_1$), 0.1 to 100 millimoles of the organoaluminum compound (b') and 0.001 to 20 millimoles of carbon disulfide (c'), per each mole of 1,3-butadiene, and the molar ratio (Al/Co) of the organoaluminum compound (b') to the cobalt compound ($a'_1$) being 5 to 500, or containing 0.05 to 10 g of the material ($a'_2$) formed by electrochemically depositing metallic cobalt on metallic zinc per 100 g of 1,3-butadiene, 0.1 to 5 times the weight of the material ($a'_2$), of the organoaluminum compound (b') and 0.001 to 20 millimoles of carbon disulfide (c') per mole of 1,3-butadiene.

2. A process according to claim 1, wherein said 1,2-polymerization catalyst comprises, in addition to the cobalt component (a'), the organoaluminum compound (b') and carbon disulfide (c'), a nitrile compound (d') represented by the formula

(5)

wherein R' is an alkyl group having 1 to 10 carbon atoms, an aralkyl group having 7 to 10 carbon atoms or an aryl group having 6 to 12 carbon atoms and m is 1 or 2, in an amount such that the molar ratio $[R'(CN)_m/AlR_3]$ of the nirile compound (d') to the organoaluminum compound (b') is 0.1 to 30.

3. A process according to claim 1, wherein both the cis-1,4-polymerization and the 1,2-polymerization are performed at a temperature of −20° to 80°C under atmospheric pressure or a high pressure for 10 minutes to 10 hours.

4. A process according to claim 1, wherein said cis-1,4-polybutadiene formed by the cis-1,4-polymerization contains 90 to 100% of cis-1,4-structure and has an intrinsic viscosity [η] of 1.5 to 8 in toluene at 30°C.

5. A process according to claim 1, wherein the final polybutadiene has an intrinsic viscosity [η] of 0.9 to 8 in tetraline at 135°C.

6. A polybutadiene characterized by containing 2 to 40% of the 1,2-structure, a melting point of which structure portion is 110° to 215°C and 60 to 98% of the cis-1,4-structure and having an intrinsic viscosity [η] of 0.9 to 8 in tetraline at 135°C, and being prepared by the process of claim 1.

7. A polybutadiene characterized by containing 5 to 25% of the 1,2-structure, a melting point of which structure portion is 160° to 215°C and 75 to 95% of the cis-1,4-structure and having an intrinsic viscosity [η] of 1.2 to 5 in tetraline at 135°C, and being prepared by the process of claim 1.

8. A rubber product prepared by reacting said polybutadiene defined in claim 6, with a vulcanizing agent.

9. A rubber product prepared by reacting said polybutadiene defined in claim 7, with a vulcanizing agent.

10. A process according to claim 1 wherein the cis-1,4-polymerization catalyst components are cobalt octoate and diethylaluminum monochloride.

11. A process according to claim 1 wherein the cis-1,4-polymerization catalyst components are cobalt naphthenate and diethyl aluminium monochloride.

12. A process according to claim 1 wherein the cis-1,4-polymerization catalyst components are cobalt octoate and dibutylaluminium monochloride.

13. A process according to claim 1 wherein the cis-1,4-polymerization catalyst components are cobalt octoate and diethylaluminium monobromide.

14. A process according to claim 1 wherein the cis-1,4-polymerization catalyst components are cobalt triacetyl acetonate and diethyl aluminium monochloride.

15. A process according to claim 1 wherein the cis-1,4-polymerization catalyst components are cobalt triacetyl acetonate and ethylaluminium sesquichloride.

16. A process according to claim 11 wherein the cis-1,4-polymerization catalyst components are cobalt chloride-pyridine complex and diethyl aluminium monochloride.

* * * * *

UNITED STATES PATENT OFFICE
CERTIFICATE OF CORRECTION

Patent No. 3,935,180　　　　　　　　　Dated January 27, 1976

Inventor(s) Shotaro Sugiura, et al

It is certified that error appears in the above-identified patent and that said Letters Patent are hereby corrected as shown below:

subparagraph (b), line 2: After "formula" add --$AlR_nX_{3-n}$--.

Claim 2, line 6 (last line of column 17): Change "$R'(CH)_m$" to --$R'(CN)_m$--.

line 5 of column 18: Change "nirile" to --nitrile--.

In the title portion of the patent, please insert the following priority data:

--Japanese Patent Application No. 45-117529 filed on December 25, 1970--

--Japanese Patent Application No. 45-117530 filed on December 25, 1970--

Signed and Sealed this

Twentieth Day of July 1976

[SEAL]

Attest:

RUTH C. MASON　　　　　　　　　C. MARSHALL DANN
*Attesting Officer*　　　　　　　*Commissioner of Patents and Trademarks*